(12) United States Patent
Deokar et al.

(10) Patent No.: US 11,561,534 B2
(45) Date of Patent: Jan. 24, 2023

(54) ADAPTIVE REPEATER FOR INDUSTRIAL COMMUNICATION

(71) Applicant: SIEMENS AKTIENGESELLSCHAFT, Munich (DE)

(72) Inventors: Chetan Sharad Deokar, Bangalore (IN); Slava Friesen, Rülzheim (DE); Michael Geppert, Ottersweier (DE); Robert Heislbetz, Steinheim (DE); Anusha Kurra, Andhra Pradesh (IN); Anand Venkatramani, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/266,572

(22) PCT Filed: Aug. 6, 2018

(86) PCT No.: PCT/EP2018/071276
§ 371 (c)(1),
(2) Date: Feb. 5, 2021

(87) PCT Pub. No.: WO2020/030243
PCT Pub. Date: Feb. 13, 2020

(65) Prior Publication Data
US 2021/0294306 A1    Sep. 23, 2021

(51) Int. Cl.
*H04L 25/20* (2006.01)
*G05B 19/418* (2006.01)
(Continued)

(52) U.S. Cl.
CPC ........ *G05B 19/4186* (2013.01); *H04L 25/207* (2013.01); *H04L 67/125* (2013.01);
(Continued)

(58) Field of Classification Search
CPC ... G05B 19/4186; H04L 25/20; H04L 67/125; H04L 69/08; H04L 69/28
See application file for complete search history.

(56) References Cited

U.S. PATENT DOCUMENTS

| | | |
|---|---|---|
| 6,195,360 B1 | 2/2001 | Raza |
| 2008/0273486 A1 | 11/2008 | Pratt |
| 2016/0172994 A1* | 6/2016 | Chang .................... G01R 31/40 700/297 |

FOREIGN PATENT DOCUMENTS

EP    2639704 A1    9/2013

OTHER PUBLICATIONS

International Search Report and the Written Opinion for International Patent Application PCT/EP2018/071276 dated May 23, 2019.

* cited by examiner

*Primary Examiner* — Mansour Oveissi
(74) *Attorney, Agent, or Firm* — Lempia Summerfield Katz LLC (57) ABSTRACT

A system and a method for industrial communication, employing an adaptive repeater supporting communication between at least two communicating devices using one of two or more predetermined communication protocols at a time instant, are provided. The adaptive repeater includes a communication direction module and a protocol adapter module operably coupled to one another. The communication direction module detects a direction of communication between the communicating devices using physical layer parameters of the communication protocols, and establishes communication there-between, using a sampling clock. The protocol adapter module adapts the communication direction module to the communication protocol in use, by generating the sampling clock.

7 Claims, 4 Drawing Sheets

(51) Int. Cl.
*H04L 67/125* (2022.01)
*H04L 69/08* (2022.01)
*H04L 69/28* (2022.01)
(52) U.S. Cl.
CPC .............. *H04L 69/08* (2013.01); *H04L 69/28* (2013.01); *G05B 2219/31369* (2013.01)

ADAPTIVE REPEATER FOR INDUSTRIAL COMMUNICATION

This application is the National Stage of International Application No. PCT/EP2018/071276, filed Aug. 6, 2018. The entire contents of this document is hereby incorporated herein by reference.

BACKGROUND

The present embodiments relate to industrial systems. More particularly, the present embodiments relate to communication methods in the industrial systems.

Typically, in industrial communication systems, the programmable logic controllers (PLCs) and sensors communicate over physical communication interfaces such as RS-485 employing differential signalling (e.g., differential lines). The communication protocols used primarily in these industrial communication systems are Modbus and Profibus to exchange data. For intrinsic safety of the communicating devices, galvanic isolation between a PLC and a sensor is provided. This includes isolation for power lines as well as data lines, for example, by using digital isolators. However, digital isolators provide isolation and replica of data only for single-ended lines. Therefore, isolation for differential lines cannot be achieved merely by using the digital isolators. For differential lines, a module for converting differential signals to single-ended signals, isolating the single-ended signals, and converting the single-ended signals back to differential signals is to be provided. This module is conventionally referred to as a repeater.

Presently, the industrial systems employ Modbus repeaters or Profibus repeaters based on an intended application. If the protocol is to be switched between Modbus and Profibus, the repeater is to be physically replaced, but there is no change required to be made in the physical layer (e.g., the communication interface employed). Alternatively, known industrial communication systems employ conversion modules for conversion between Modbus and Profibus protocols. Moreover, these modules are implemented at the protocol level and not at the physical layer. Thus, the conventional industrial communication systems are largely dependent on conversion modules and/or multiple repeaters for a switch in communication protocols, thereby increasing costs and maintenance of the communication devices associated therewith.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an industrial communication system that supports multiple communication protocols and adapts to the communication protocol being used, while eliminating conversion between the communication protocols and dependency on multiple repeaters, is provided. This thereby makes the industrial communication system protocol agnostic while providing there is no increase in costs or maintenance associated therewith.

The embodiments disclosed herein provide an adaptive repeater that supports two or more communication protocols based on which devices of the industrial communication system are able to communicate with one another.

The industrial communication system includes at least two communicating devices communicating with one another. The communicating devices include field devices (e.g., PLCs, sensors, etc.). The communicating devices use one of two or more predetermined communication protocols at a time instant for communicating therebetween. As used herein, "predetermined communication protocols" refer to communication protocols that have a common physical layer interface. These communication protocols include, for example, Modbus, Profibus, BACnet, etc. that employ RS-485 physical layer interface.

The industrial communication system includes an adaptive repeater configured to support the communication protocols. As used herein, "adaptive repeater" refers to a module that adapts itself to the communication protocol being used or is being desired to be used for communication between the communicating devices. In one embodiment, the adaptive repeater performs the aforementioned adaption (e.g., switching between the communication protocols) without conversion and/or without employing multiple repeaters involving one repeater for each of the communication protocols being supported. The adaptive repeater includes a communication direction module and a protocol adapter module operably coupled to one another. According to an embodiment, the adaptive repeater includes the communication direction module, the protocol adapter module, at least one clock source, a communication database, and transceivers of each of the communicating devices, operably coupled to one another. According to this embodiment, the adaptive repeater is configured as a stand-alone barrier board supporting communication between the communicating devices using one of the two or more predetermined communication protocols.

The communication direction module detects a direction of the communication between the communicating devices and establishes communication therebetween using a sampling clock. The communication direction module uses the sampling clock to periodically sample and monitor transceivers of each of the communicating devices for detecting data being transmitted, if any, by the communicating devices. When the communication direction module detects signals representing data on any of the transceivers of the communicating devices, the communication direction module sets the respective transceiver of the communicating device(s) to a receive mode of operation in order to receive the incoming data and sets the transceivers of remaining communicating devices into a transmit mode of operation. When no further signals are detected, each of the transceivers is switched to an idle mode of operation and the communication direction module reverts to polling (e.g., periodically sampling the transceivers using the sampling clock). In one embodiment, the communication direction module is protocol-agnostic, as the communication direction module detects the direction of communication based on physical layer parameters of the communication protocols. The physical layer parameters include, for example, a bit structure of the data, a modulation scheme employed, a transmission power, a transmission distance, a channel used for the transmission of data, etc. For example, the communication direction module monitors the bit structure of the data such as a falling edge of a start bit in order to detect the direction. In one embodiment, the communication protocols that the adaptive repeater disclosed herein supports have a common physical layer interface (e.g., RS485).

The protocol adapter module is configured to adapt the communication direction module to the communication protocol in use by generating the sampling clock. The protocol adapter module includes a parameter reception module, a baud rate identification module, and a sampling clock generation module. The parameter reception module receives one or more communication parameters associated with the communication protocols, from a user device. As used herein, the communication parameters refer to parameters associated with the data being communicated between the communicating devices. The communication parameters include, for example, a speed of transmission of the data, which is provided as an input via the user device such as a user selection dial or a user switch, a frequency of transmission of the data, a structure of a packet of the data such as a parity bit, a stop bit, required to be set in the packet, etc. The baud rate identification module identifies a baud rate based on the communication parameters received, for example, by retrieving a baud rate from a communication database of the industrial communication system storing therein baud rates associated with various communication frequencies and/or the communication parameters. In one embodiment, the communication parameters include desired baud rate associated with the communication (e.g., the parameter reception module receives the baud rate as an input and provides the baud rate to the baud rate identification module). The sampling clock generation module generates the sampling clock based on the baud rate. The sampling clocks for each baud rate are also maintained in the communication database along with the corresponding communication protocols. The sampling clock generation module is operably coupled to at least one clock source using which the sampling clock is generated. In an embodiment, the clock source is configured to generate sampling clocks corresponding to more than one communication protocols supported by the adaptive repeater. In one embodiment, as and when the user input changes, the protocol adapter module changes the sampling clock generated thereby, adapting the communication direction module to switch between communication protocols.

Also disclosed herein is an adaptive repeater, supporting two or more predetermined communication protocols for communication in an industrial communication system. The adaptive repeater is operably coupled to at least two communicating devices communicating with one another using one of the two or more communication protocols at a time instant. The adaptive repeater includes a communication direction module and a protocol adapter module operably coupled to one another and functioning as disclosed above. According to an embodiment, the adaptive repeater includes the communication direction module, the protocol adapter module, at least one clock source, a communication database, and transceivers of each of the communicating devices, operably coupled to one another, as disclosed above. According to this embodiment, the adaptive repeater is configured as a stand-alone barrier board supporting communication between the communicating devices using one of the two or more predetermined communication protocols.

The adaptive repeater disclosed herein includes a processor (e.g., a microprocessor, a central processing unit (CPU) device, a finite state machines, a microcontroller, a digital signal processor, an application specific integrated circuit (ASIC), a field-programmable gate array (FPGA), a complex programmable logic device (CPLD), etc. or any combination thereof) capable of executing computer programs or a series of commands, instructions, or state transitions. The processor may also be implemented as a processor set including, for example, a general purpose microprocessor and a math or graphics co-processor. The processor is selected, for example, from the Intel® processors, Advanced Micro Devices (AMD®) processors, International Business Machines (IBM®) processors, Xilinx® FPGAs/CPLDs, Altera FPGAs/CPLDs, Actel® FPGAs/CPLDs, Lattice FPGAs/CPLDs, etc. The processor executes the modules (e.g., communication direction module and the protocol adapter module). The adaptive repeater disclosed herein, in another embodiment, includes a memory unit used for storing programs, applications, and data. For example, the parameter reception module, the baud rate identification module, the sampling clock generation module, etc., are stored in the memory unit. The memory unit is, for example, a flash memory, a random access memory (RAM), or another type of dynamic storage device that stores information and instructions for execution by the processor. The memory unit also stores temporary variables and other intermediate information used during execution of the instructions by the processor. For example, the memory unit stores a list of baud rates corresponding to each of the communication protocols.

Also disclosed herein is a method for communicating in an industrial communication system. The method includes providing an adaptive repeater module as disclosed above. The method includes: receiving, by a parameter reception module, one or more communication parameters associated with the two or more communication protocols from a user device; identifying, by a baud rate identification module, a baud rate based on the one or more communication parameters; generating, by a sampling clock generation module, a sampling clock based on the baud rate; using at least one clock source; detecting, by the communication direction module, a direction of communication between the communicating devices based on physical layer parameters of the communication protocols; using the sampling clock; establishing, by the communication direction module, communication between the communicating devices in the direction of communication; using the sampling clock; and adapting the established communication, by the communication direction module, based on the communication protocol in use.

The above-mentioned and other features of the present embodiments will now be addressed with reference to the accompanying drawings. The illustrated embodiments are intended to illustrate but not limit the invention.

DETAILED DESCRIPTION

Various embodiments are described with reference to the drawings, where like reference numerals are used to refer to like elements throughout. In the following description, for the purpose of explanation, numerous specific details are set forth in order to provide thorough understanding of one or more embodiments. Such embodiments may be practiced without these specific details.

Figure 1:
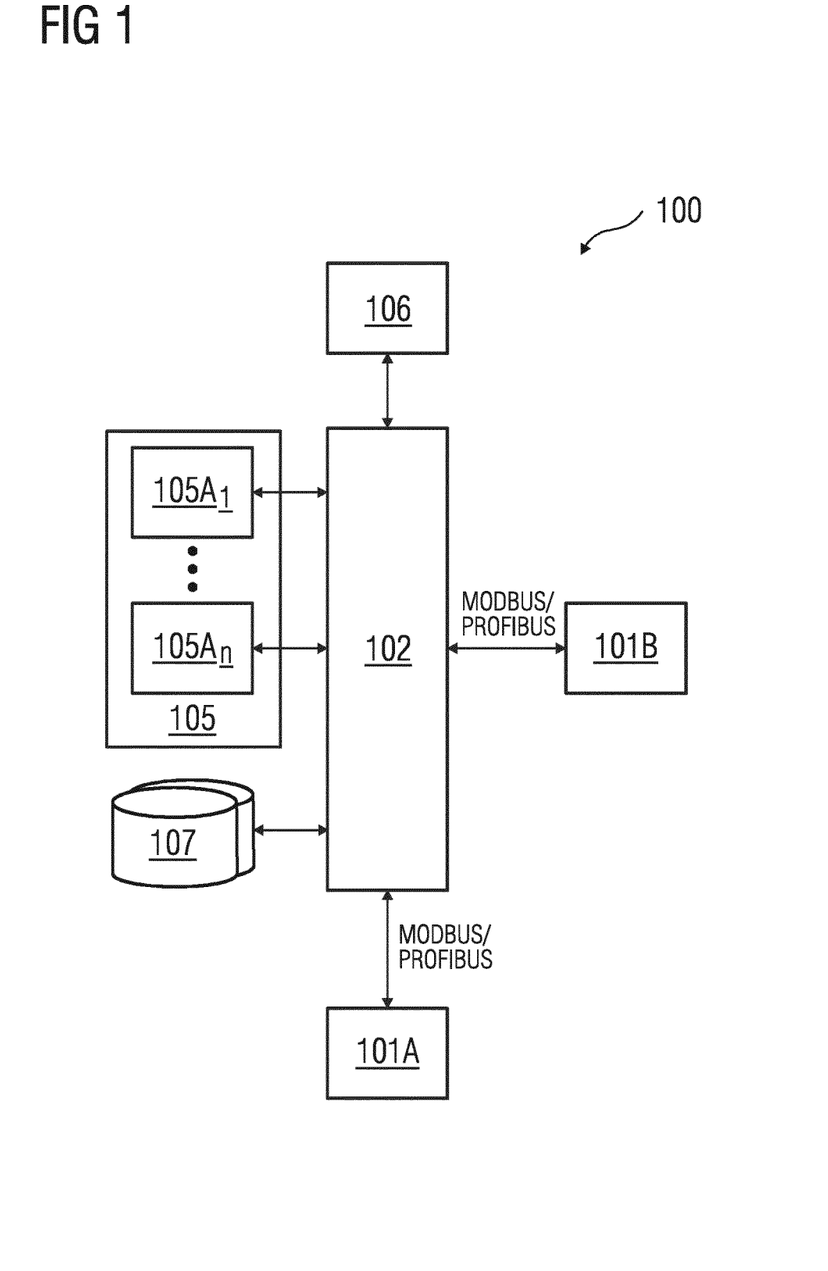
FIG. 1 illustrates a block diagram of an industrial communication system comprising an adaptive repeater supporting two or more communication protocols, according to an embodiment.

FIG. 1 illustrates a block diagram of one embodiment of an industrial communication system 100 including an adaptive repeater 102 supporting two or more communication protocols (e.g., Modbus and Profibus having RS485 physical layer interface). The industrial communication system 100 includes communicating devices 101A and 101B communicating with one another via the adaptive repeater 102 using one of the communication protocols at a time instant. The adaptive repeater 102 is operably coupled to a user device 106, at least one clock source 105, and a communication database 107. The clock source 105 according to an embodiment may include multiple clock sources $105A_1$-$105A_n$ generating a range of sampling clocks. The communication database 107 stores, for example, communication parameters received from the user device, a mapping of the communication parameters with parameters associated with the physical layer interface for the communication protocols, baud rates associated with each of the communication protocols, sampling clocks, etc.

Figure 2A:
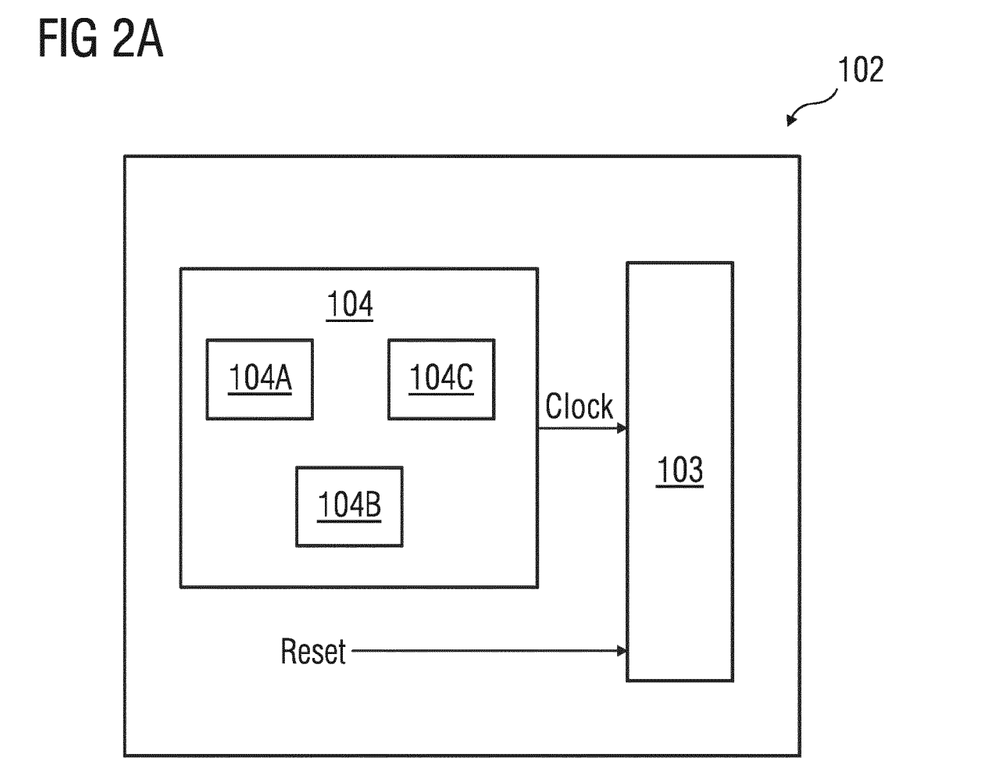
FIGS. 2A-2B illustrate a block diagram of the adaptive repeater shown in FIG. 1, according to embodiments.
Figure 2B:
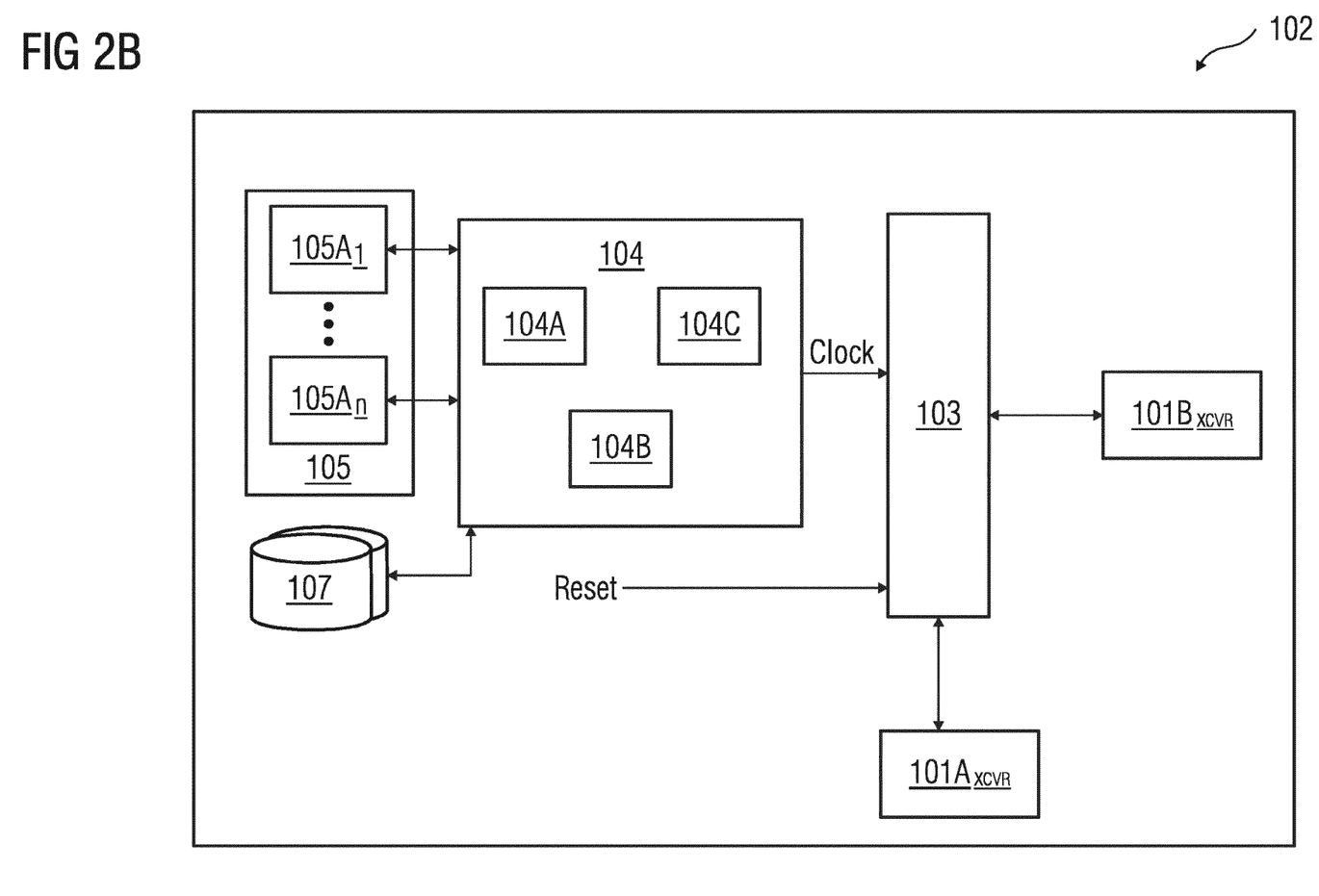

FIGS. 2A-2B illustrate a block diagram of the adaptive repeater 102 shown in FIG. 1, according to embodiments. As shown in FIG. 2A, the adaptive repeater 102 includes a communication direction module 103 and a protocol adapter module 104 operably coupled to one another. The protocol adapter module 104 includes a parameter reception module 104A, a baud rate identification module 104B, and a sampling clock generation module 104C. The parameter reception module 104A is operably coupled to the user device 106 shown in FIG. 1. The baud rate identification module 104B and the sampling clock generation module 104C are operably coupled to the clock source 105 shown in FIG. 1. The sampling clock generation module 104C is also operably coupled to the communication direction module 103 for providing the sampling clock. As shown in FIG. 2B, the adaptive repeater 102, according to another embodiment, includes the communication direction module 103, the protocol adapter module 104, the at least one clock source 105, the communication database 107, and transceivers $101A_{XCVR}$, $101B_{XCVR}$ of each of the communicating devices 101A and 101B, operably coupled to one another. According to this embodiment, the adaptive repeater 102 is in operable communication with the communicating devices 101A and 101B via the respective transceivers $101A_{XCVR}$, $101B_{XCVR}$. According to this embodiment, the adaptive repeater 102 is configured as a stand-alone barrier board supporting communication between the communicating devices 101A and 101B using one of the two or more predetermined communication protocols.

Figure 3:
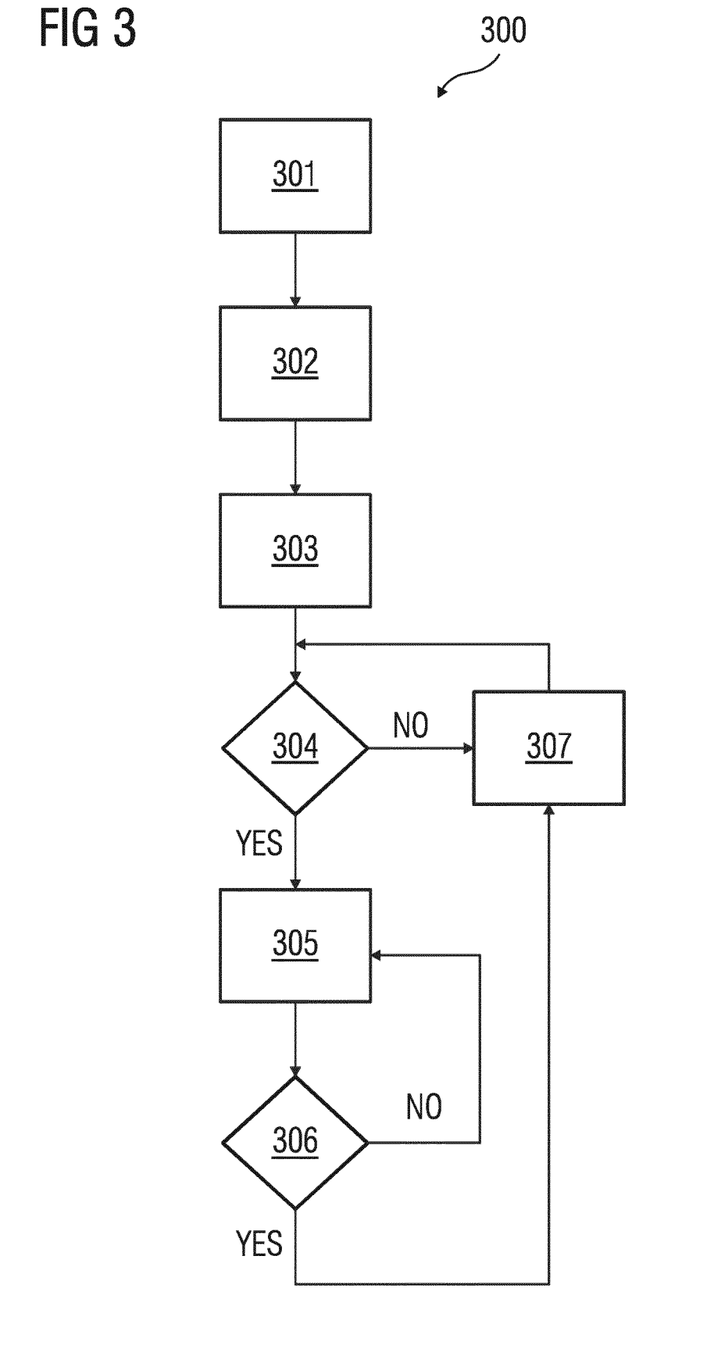
FIG. 3 illustrates a process flow chart of a method for communicating in the industrial communication system shown in FIG. 1, according to an embodiment.

FIG. 3 illustrates a process flow chart of a method 300 for communicating in the industrial communication system 100 shown in FIG. 1, according to an embodiment. The method aims to establish communication between communicating devices 101A and 101B. The method employs the adaptive repeater 102 including the communication direction module 103 and the protocol adapter module 104, shown in FIG. 2 supporting Modbus and Profibus communication protocols employing RS485 physical layer interface. At act 301, the parameter reception module 104A continuously monitors for communication parameters associated with the communication protocols being sent if any from a user device 106, shown in FIG. 1. The communication parameters include a desired speed of communication and/or the associated Baud rate. At act 302, the baud rate identification module 104B identifies an associated baud rate required for the communication based on the communication parameters received. At act 303, the sampling clock generation module 104C generates a sampling clock using the clock source 105, or one of the clock sources $105A_1$-$105A_n$ based on the baud rate identified, by accessing a table as shown below from a communication database 107 shown in FIG. 1.

| User input (Dial position) | User input (Baud rate) | Communication Protocol | Sampling Clock |
|---|---|---|---|
| Low Speed | 1200 | Modbus | 19200 |
| Low Speed | 2400 | Modbus | 38400 |
| Low Speed | 4800 | Modbus | 76800 |
| Medium Speed | 9600 | Modbus, Profibus | 153600 |
| Medium Speed | 19200 | Modbus, Profibus | 307200 |
| Medium Speed | 38400 | Modbus | 614400 |
| Medium Speed | 57600 | Modbus | 921600 |
| High Speed | 115200 | Modbus | 1843200 |
| High Speed | 460800 | Modbus | 7372800 |
| Medium Speed | 45450 | Profibus | 727200 |
| High Speed | 93750 | Profibus | 1500000 |
| High Speed | 187500 | Profibus | 3000000 |
| High Speed | 500000 | Profibus | 8000000 |
| High Speed | 1500000 | Profibus | 24000000 |

At act 304, the communication direction module 103 uses the sampling clock to detect a direction of communication by checking whether a transceiver T1 of the communicating device 101A or a transceiver T2 of the communicating device 101B is ready to send data. If none of the transceivers T1 and T2 are ready to send data, the communication direction module 103 remains in an idle state at 307, and keeps monitoring the transceivers. If one of the transceivers T1 or T2 is ready to send data, at act 305, the communication direction module 103 establishes communication between the communicating devices 101A and 101B in the detected direction (e.g., T1-T2 or T2-T1), where the sending transceiver sends a data packet to the receiving transceiver using the communication protocol corresponding to the sampling clock. At act 306, the communication direction module 103 checks if the transfer is complete. If not, the communication direction module 103 maintains the established communication direction. If yes, the communication direction module 103, at act 307, remains in an idle state until further data packets are detected to be transmitted on either of the transceivers T1 or T2. This detection is performed every time, using the sampling clock provided by the sampling clock generation module 104C, which changes in sync with the user input. Thus, the communication direction module 103 with the protocol adapter module 104 adapts to the baud rates received as an input, resulting in change of the associated sampling clock, and/or the associated communication protocol being used.

The foregoing examples have been provided merely for the purpose of explanation and are in no way to be construed as limiting of the present invention disclosed herein. While the invention has been described with reference to various embodiments, the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

The elements and features recited in the appended claims may be combined in different ways to produce new claims that likewise fall within the scope of the present invention.

Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An industrial communication system comprising:
   at least two communicating devices communicating with one another, wherein one of two or more predetermined communication protocols is in use at a time instant by each of the at least two communicating devices; and
   an adaptive repeater configured to support the two or more predetermined communication protocols, the adaptive repeater comprising:
      a communication direction module configured to:
         detect a direction of communication between the at least two communicating devices using a sampling clock generated using at least one clock source;
         establish communication between the at least two communicating devices; and
         periodically sample and monitor transceivers of each of the at least two communicating devices using the sampling clock, such that signals representing data are detectable on any of the transceivers; and
      a protocol adapter module operably coupled to the communication direction module, the protocol adapter module being configured to:
         adapt the communication direction module to the communication protocol in use, the adaptation of the communication direction module to the communication protocol in use comprising generation of the sampling clock; and
         change the sampling clock to adapt the communication direction module to switch between the two or more predetermined communication protocols.

2. The industrial communication system of claim 1, wherein the communication direction module is configured to detect the direction of communication based on physical layer parameters of the two or more predetermined communication protocols.

3. The industrial communication system of claim 1, wherein the protocol adapter module comprises:
   a parameter reception module configured to receive one or more communication parameters associated with the two or more predetermined communication protocols from a user device;
   a baud rate identification module configured to identify a baud rate based on the one or more communication parameters; and
   a sampling clock generation module configured to generate the sampling clock based on the baud rate, using at least one clock source operably coupled to the adaptive repeater.

4. An adaptive repeater supporting two or more predetermined communication protocols for communication in an industrial communication system, wherein the adaptive repeater is configured to be operably coupled to at least two communicating devices communicating with one another using one of the two or more predetermined communication protocols at a time instant, the adaptive repeater comprising:
   a communication direction module configured to:
      detect a direction of communication between the at least two communicating devices using a sampling clock source;
      establish communication between the at least two communicating devices;
      periodically sample and monitor transceivers of each of the at least two communicating devices using the sampling clock, such that signals representing data are detectable on any of the transceivers; and
   a protocol adapter module operably coupled to the communication direction module, wherein the protocol adapter module is configured to:
      adapt the communication direction module to the communication protocol in use, the adaptation of the communication direction module comprising generation of the sampling clock; and
      change the sampling clock to adapt the communication direction module to switch between the two or more predetermined communication protocols.

5. The adaptive repeater of claim 4, wherein the communication direction module is configured to detect the direction of communication based on physical layer parameters of the two or more predetermined communication protocols.

6. The adaptive repeater of claim 4, wherein the protocol adapter module comprises:
   a parameter reception module configured to receive one or more communication parameters associated with the two or more communication protocols from a user device;
   a baud rate identification module configured to identify a baud rate based on the one or more communication parameters; and
   a sampling clock generation module configured to generate the sampling clock based on the baud rate, using at least one clock source operably coupled to the adaptive repeater.

7. A method for communicating in an industrial communication system, the method comprising:
   providing an adaptive repeater configured to support two or more predetermined communication protocols for communication in the industrial communication system, the adaptive repeater comprising a communication direction module and a protocol adapter module, the adaptive repeater being operably coupled to at least two communicating devices communicating with one another using one of the two or more predetermined communication protocols at a time instant;
   receiving, by a parameter reception module of the protocol adapter module, one or more communication parameters associated with the two or more predetermined communication protocols from a user device;
   identifying, by a baud rate identification module of the protocol adapter module, a baud rate based on the one or more communication parameters;
   generating, by a sampling clock generation module of the protocol adapter module, a sampling clock based on the baud rate, using at least one clock source operably coupled to the adaptive repeater;
   detecting, by the communication direction module, a direction of communication between the at least two communicating devices based on physical layer parameters of the two or more predetermined communication protocols, using the sampling clock, wherein detecting the direction of communication between the at least two communicating devices comprises periodically sampling and monitoring transceivers of each of the at least two communicating devices using the sampling clock to detect signals representing data on any of the transceivers;

establishing, by the communication direction module, communication between the two or more communicating devices in the direction of communication, using the sampling clock;

changing, by the protocol adapter module, the sampling clock to adapt the communication direction module to switch between the two or more communication protocols; and adapting the established communication, by the communication direction module, based on the communication protocol in use.

\* \* \* \* \*

UNITED STATES PATENT AND TRADEMARK OFFICE
CERTIFICATE OF CORRECTION

PATENT NO. : 11,561,534 B2
APPLICATION NO. : 17/266572
DATED : January 24, 2023
INVENTOR(S) : Chetan Deokar et al.

It is certified that error appears in the above-identified patent and that said Letters Patent is hereby corrected as shown below:

On the Title Page

Item (72) Inventors:
"Slava Friesen, RÜlzheim (DE)"
Should be replaced with:
"Slava Friesen, Rülzheim (DE)"

Signed and Sealed this
Nineteenth Day of September, 2023

Katherine Kelly Vidal
*Director of the United States Patent and Trademark Office*